(12) United States Patent
Belshe et al.

(10) Patent No.: US 10,277,658 B2
(45) Date of Patent: Apr. 30, 2019

(54) REDUCTION OF WEB PAGE LOAD TIME USING HTTP HEADER COMPRESSION

(71) Applicant: GOOGLE LLC, Mountain View, CA (US)

(72) Inventors: Michael Belshe, Saratoga, CA (US); Roberto Peon, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 81 days.

(21) Appl. No.: 14/954,901

(22) Filed: Nov. 30, 2015

(65) Prior Publication Data

US 2016/0088059 A1 Mar. 24, 2016

Related U.S. Application Data

(63) Continuation of application No. 13/183,048, filed on Jul. 14, 2011, now Pat. No. 9,203,684.
(Continued)

(51) Int. Cl.
*H04L 29/08* (2006.01)
*G06F 17/30* (2006.01)
*H04L 29/06* (2006.01)

(52) U.S. Cl.
CPC ........ *H04L 67/02* (2013.01); *G06F 17/30902* (2013.01); *H04L 29/06* (2013.01);
(Continued)

(58) Field of Classification Search
USPC .................................. 709/217, 230–233, 247
See application file for complete search history.

(56) References Cited

U.S. PATENT DOCUMENTS 5,953,503 A * 9/1999 Mitzenmacher ........ H04L 29/06
709/203
6,345,307 B1 * 2/2002 Booth ..................... H04L 69/04
709/247
(Continued)

OTHER PUBLICATIONS

Liu, Zhigang, Yousuf Saifullah, Marc Greis, and Srinivas Sreemanthula. "HTTP compression techniques." In Wireless Communications and Networking Conference, 2005 IEEE, vol. 4, pp. 2495-2500. IEEE, 2005.*

(Continued)

*Primary Examiner* — Suraj M Joshi
*Assistant Examiner* — Melaku Y Habtemariam
(74) *Attorney, Agent, or Firm* — Morgan, Lewis & Bockius LLP

(57) ABSTRACT

Methods and systems for reducing web page load time using HTTP header compression are provided. A method for reducing web page load time includes preloading HTTP header keywords into a compression dictionary. The method also includes compressing one or more fields in an HTTP header corresponding with a web page request using the compression dictionary. The method further includes transmitting the compressed HTTP header over a network. A system for reducing web page load time includes a compression dictionary preloaded with HTTP header keywords. The system also includes a header compressor to compress one or more fields in an HTTP header using the compression dictionary, and a transmitter to transmit the compressed HTTP header over a network.

24 Claims, 5 Drawing Sheets

Related U.S. Application Data

(60) Provisional application No. 61/364,259, filed on Jul. 14, 2010.

(52) U.S. Cl.
CPC .......... *H04L 29/0604* (2013.01); *H04L 69/04* (2013.01); *H04L 69/22* (2013.01)

(56) References Cited

U.S. PATENT DOCUMENTS

| | | |
|---|---|---|
| 6,721,792 B2 | 4/2004 | Erickson et al. |
| 6,804,238 B1* | 10/2004 | Euget .................. H04L 29/06 370/392 |
| 7,669,120 B2 | 2/2010 | Liao et al. |
| 8,601,164 B2 | 12/2013 | Grimsley et al. |
| 2002/0057716 A1* | 5/2002 | Svanbro .................. H03M 7/30 370/477 |
| 2002/0093938 A1* | 7/2002 | Tourunen ................ H04L 29/06 370/349 |
| 2002/0156901 A1* | 10/2002 | Erickson ................ H04L 29/06 709/227 |
| 2003/0197630 A1 | 10/2003 | Border et al. |
| 2004/0081151 A1* | 4/2004 | Greis ..................... H04L 69/04 370/392 |
| 2004/0128538 A1* | 7/2004 | Gmuender ............. H04L 29/06 726/4 |
| 2005/0044270 A1 | 2/2005 | Grove et al. |
| 2005/0083934 A1* | 4/2005 | Tan ......................... H04L 29/06 370/392 |
| 2005/0198395 A1* | 9/2005 | Verma ............... G06F 17/30902 709/247 |
| 2008/0037543 A1 | 2/2008 | Sala et al. |
| 2008/0155016 A1* | 6/2008 | Tsai .................... H04L 67/2842 709/203 |
| 2008/0267217 A1* | 10/2008 | Colville .................. H04L 47/10 370/477 |
| 2011/0078309 A1* | 3/2011 | Bloch ............... H04L 29/12066 709/224 |
| 2011/0231577 A1 | 9/2011 | Rezaiifar et al. |
| 2012/0017010 A1 | 1/2012 | Chauhan |

OTHER PUBLICATIONS

EFFNET AB, "An Introduction to IP Header Compression," Feb. 2004, Bromma Sweden, 13 pages.

Liu, et al., "HTTP compression techniques," 2005, Wireless Communications and Networking Conference, IEEE vol. 4.

Oettinger, "Improved User Perceived Performance Through Client-State Aware Gateway," Sep. 2008, Technical University of Denmark, pp. i-xiv and 1-111.

* cited by examiner

REDUCTION OF WEB PAGE LOAD TIME USING HTTP HEADER COMPRESSION

CROSS REFERENCE TO RELATED APPLICATIONS

This application is a continuation of U.S. application Ser. No. 13/183,048, filed Jul. 14, 2011, entitled "Reduction Of Web Page Load Time Using HTTP Header Compression," which claims the benefit of U.S. Provisional Appl. No. 61/364,259, filed Jul. 14, 2010, the entire contents of which are herein incorporated by reference in their entirety.

TECHNICAL FIELD

Embodiments relate to internet communication.

BACKGROUND

Today, Hypertext Transfer Protocol (HTTP) and Transmission Control Protocol (TCP) are protocols of the web. TCP is a generic, reliable transport protocol, providing guaranteed delivery, duplicate suppression, in-order delivery, flow control, congestion avoidance and other transport features. HTTP is an application level protocol providing basic request/response semantics. For example, as shown in FIG. 1, HTTP Requester 110 may send a request, such as for a web page, over network 120. HTTP Responder 130 may receive the HTTP request and return an HTTP response, such as content for the requested web page.

Unfortunately, HTTP over TCP was not particularly designed with consideration of latency effects. Request and response headers vary in size and can include some redundancy. Furthermore, web pages transmitted today are significantly different in size and function from web pages 10 years ago.

Previous solutions to address web latency have included changes at the transport layer. Proposals have included, for example, replacing TCP with another transport-layer protocol such as Stream Control Transmission Protocol (SCTP) or Structured Stream Transport (SST). Other proposals include intermediate-layer protocols in between the transport and application layers. However, changes to the existing transport protocol would be very difficult to employ and problems inherent in HTTP would still need to be addressed.

BRIEF SUMMARY

Embodiments of this invention relate to reducing web page load time using HTTP header compression. According to an embodiment, a method for reducing web page load time includes preloading HTTP header keywords into a compression dictionary. This method also includes compressing one or more fields in an HTTP header corresponding with a web page request using the compression dictionary. The method further includes transmitting the compressed HTTP header over a network.

According to another embodiment, a system for reducing web page load time includes a compression dictionary preloaded with HTTP header keywords. The system also includes a header compressor to compress one or more fields in an HTTP header corresponding with a web page request using the compression dictionary. The system further includes a transmitter to transmit the compressed HTTP header over a network.

According to a further embodiment, a method for reducing web page load time includes receiving a compressed HTTP header corresponding with a web page request. One or more fields in the compressed HTTP header have been compressed using a compression dictionary associated with the web page request. The method also includes determining HTTP header information according to the compression dictionary.

According to another embodiment, a system for reducing web page load time includes a receiver to receive a compressed HTTP header corresponding with a web page request. One or more fields in the compressed HTTP header have been compressed using a compression dictionary associated with the web page request. The system also includes a local compression dictionary corresponding to the compression dictionary used to compress the received compressed HTTP header. The system further includes a header parser to determine HTTP header information according to the local compression dictionary.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

HTTP IS the application level protocol providing basic request/response semantics. Unfortunately, HTTP was not particularly designed with consideration of latency effects. Furthermore, the web pages transmitted today are significantly different in size and function from web pages 10 years ago and demand improvements to HTTP that could not have been anticipated when HTTP was developed. Some features of HTTP contribute to unnecessary latency. For example, request and response headers are not compressed. Request headers today vary in size from ~200 bytes to over 2 KB. As applications use more cookies and user agents expand features, typical header sizes of 700-800 bytes are common.

For modems or ADSL connections, in which the uplink bandwidth is fairly low, this latency can be significant. Reducing the data in headers could directly improve the serialization latency to send requests.

In addition, some headers are redundant. Several headers are repeatedly sent across requests on the same channel. However, headers such as the User-Agent, Host, and Accept are generally static and do not need to be present. Also, HTTP uses optional compression encodings for data. Content could always be sent in a compressed format.

Some proposed solutions to the web's latency problems have included replacing the transport protocol. In practical terms, changing the transport is very difficult to deploy and the problems inherent in HTTP (compression, etc.) still need to be addressed, regardless of the underlying transport protocol.

The shortcomings of the application layer can be addressed with minimal changes to existing infrastructure while requiring little or no change from the perspective of web application writers. One solution includes HTTP header compression. Web clients today send a significant amount of redundant data in the form of HTTP headers. Because a single web page may require 50 or 100 subrequests, this data is significant. Compressing the request and/or response HTTP headers results in the transmission of fewer packets and fewer bytes, which saves a significant amount of download time and bandwidth compared to HTTP. HTTP header compression, as described in embodiments below, can yield significant performance gains and reduce web page load time.

Example Methods and Systems

Figure 1:
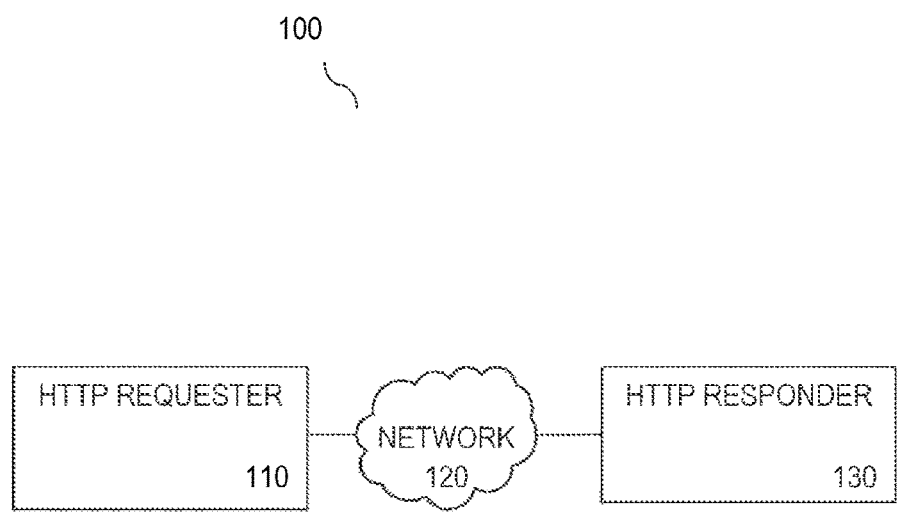
FIG. 1 shows an example internet communication network which relates to embodiments.
Figure 2:
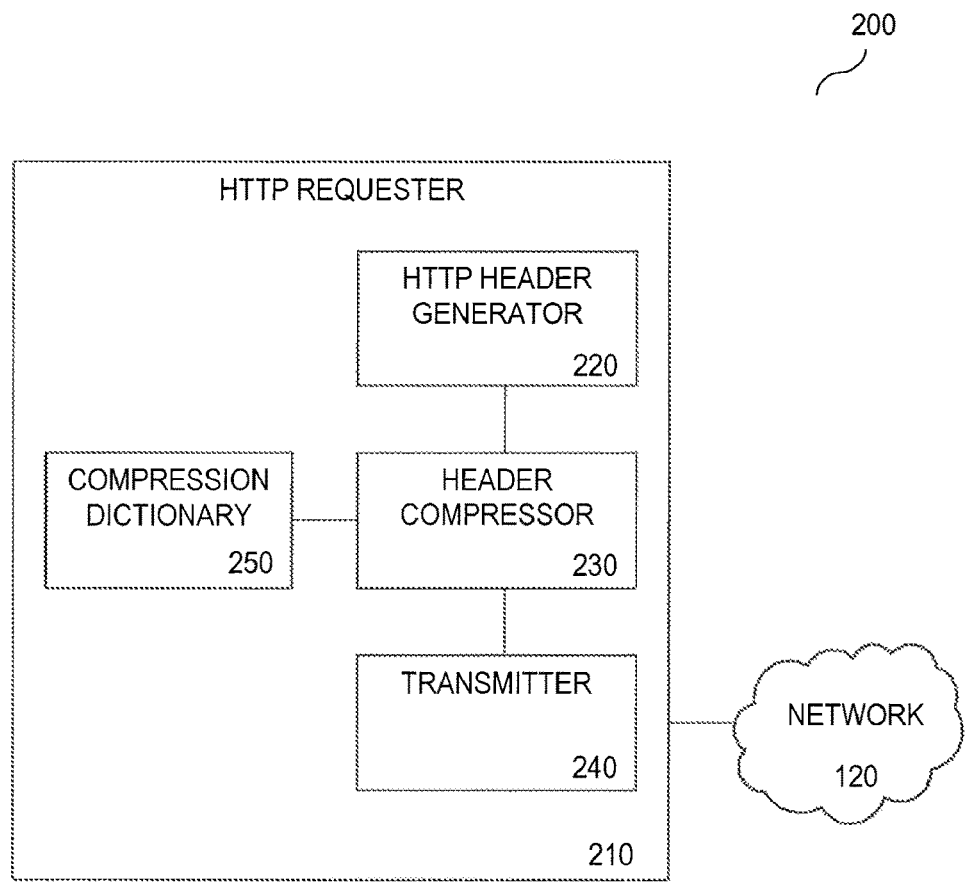
FIG. 2 illustrates an architecture diagram of a system for reducing web page load time using HTTP header compression according to an embodiment.

FIG. 2 is an architecture diagram of exemplary system 200 for reducing web page load time using HTTP header compression, according to an embodiment. System 200 includes HTTP requester 210. HTTP requester 210 may be an HTTP web client or web server established on a local device. A local device may be a computing device. Examples of computing devices include, but are not limited to, a computer, workstation, distributed computing system, computer cluster, embedded system, stand-alone electronic device, networked device, mobile device (e.g., mobile phone, smart phone or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and graphical user interface display.

According to an embodiment, HTTP requester 210 may be configured to provide the functionality of a web client, which is a software component that makes an HTTP request to an HTTP responder, such as an HTTP server. As illustrative examples, an HTTP server may be, without limitation, an Apache HTTP Server, Apache Tomcat, MICROSOFT Internet Information Server, JBOSS Application Server, WEBLOGIC Application Server, or SUN JAVA System Web Server. A web server may contain web applications which generate content in response to an HTTP request. A web server may package the generated content and serve the content to a client in the form of an HTTP response. HTTP requester 210 may transmit HTTP requests and receive HTTP responses over network 120.

According to an embodiment, HTTP requester 210 may include HTTP header generator 220, header compressor 230, transmitter 240 and compression dictionary 250. HTTP header generator 220 may be configured to generate HTTP headers, according to an embodiment. In some embodiments, HTTP header generator 220 may be configured to generate headers according to well known methods of HTTP protocol and communication. In other embodiments, HTTP header generator 220 may be configured to generate headers using well known methods of packet header generation but according to specific HTTP header generation instructions. HTTP header generator 220 may be coupled to header compressor 230.

Header compressor 230 may be configured to compress one or more fields of one or more HTTP headers, according to an embodiment. HTTP headers may be received from HTTP header generator 220. In some cases, header compressor 230 may perform the functions of HTTP header generator. In other cases, header compressor 230 may generate HTTP headers with field names and values in a compressed format.

According to an embodiment, HTTP header compression may include compressing name value pairs. Name value pairs may be compressed using compression encoding, such as gzip or any other compression algorithm. Compression may be stateful, or maintain status information, only across headers in the channel. Essentially, for some cases, separate compression contexts may be maintained for headers versus data. According to a further embodiment, HTTP header compression may require that each header name has at least one value. In some cases, the length of each name and value must be greater than zero. In further cases, strings are utf8 encoded and are not NULL terminated.

According to a further embodiment, header compressor 230 may use compression dictionary 250. Compression dictionary 250 may be a text string stored in memory. In some cases, compression dictionary 250 may be information stored in a structured memory that may be used for compression of HTTP headers. For example, compression dictionary 250 may include text containing the names of selected name-value pairs as to allow for transfer of only values in an HTTP header.

Compression dictionary 250 may include, for example and without limitation, the following dictionary (without line breaks):

optionsgetheadpostputdeletetraceacceptaccept-charsetaccept-encodingaccept-languageauthorizationexpectfromhostif-modified-sinceif-matchif-none-matchif-rangeif-unmodifiedsincemax-forwardsproxy-authorizationrangerefererteuser-agent1001012002012022032042052062003013023033304305306307400401402403404405406407408409410411412413414415416417500501502503504505accept-rangesa-geetaglocationproxy-authenticatepublicretry-afterservervarywarningwww-authenticateallowcontent-basecontent-encodingcache-controlconnectiondatetrailertransfer-encodingulanguagecontent-typeetagexpireslast-modifiedset-cookieMonday-TuesdayWednesdayThursdayFridaySaturdaySunday-JanFebMarAprMayJunJulAugSepOctNovDecchunkedtext/htmlimage/pngimage/jpgimage/gifapplication/xmlapplication/xhtmltext/plainpublicmax-agecharset=iso-8859-1utf-8gzipdeflateHTTP/1.1statusversionurl The dictionary above is merely an example of compression dictionary 250 and is not meant to be limiting. Compression dictionary 250 may be preloaded with HTTP header information or keywords, such as in the example above. Keywords may relate to, for example, header names and typical header values.

According to further embodiments, HTTP headers may be compressed by compressing all data sent by the client. The "host" header may also be ignored. The host:port portion of the HTTP URL is the definitive host. In some cases, user-agents may be expected to support gzip and deflate compression. Regardless of the Accept-Encoding sent by the user-agent, the server may select gzip or deflate encoding at any time. Compressed HTTP header blocks may also include content-length that is only advisory for length (so that progress meters can work).

As described above, compression may be stateful, according to an embodiment. Compression of subsequent requests may use state information from a previous compression. For example, an initial state may be a compression dictionary. A first compression may be performed and a next state may represent the dictionary and the first request. Another compression may be performed and the following state may represent the dictionary, the first request and the second request. Accordingly, compression may be improved with the next state.

According to a further embodiment, header compressor 230 may be coupled to transmitter 240. Transmitter 240 may be configured to transmit compressed HTTP headers over network 120 in packets or frames. In most cases, packets and frames may be transmitted according to well known methods of internet communication.

Each of HTTP header generator 220, header compressor 230, transmitter 240 and compression dictionary 250 may be implemented as software, hardware, firmware, or any combination thereof. According to some embodiments, system 200 may be configured to handle other protocols involved in internet or network communication.

Figure 3:
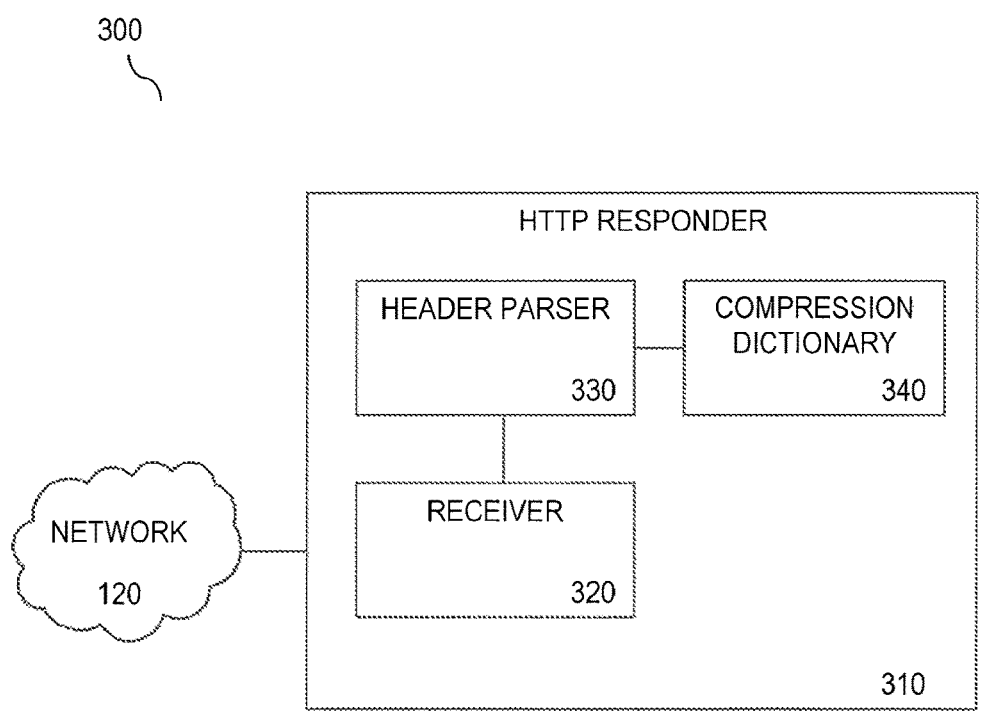
FIG. 3 illustrates an architecture diagram of a system for reducing web page load time using HTTP header compression according to an embodiment.

FIG. 3 is an architecture diagram of exemplary system 300 for reducing web page load time using HTTP header compression, according to an embodiment of the present invention. System 300 includes HTTP responder 310. HTTP responder 310 may be an HTTP web client or web server established on a local device.

According to an embodiment, HTTP responder 310 may include HTTP header receiver 320, header parser 330 and compression dictionary 340. According to a further embodiment, header parser 330 may be coupled to receiver 320. Receiver 320 may be configured to receive compressed HTTP headers over network 120. This may be the result of establishing an HTTP request-response pair between HTTP requester 210 and HTTP responder 310 corresponding to one or more web page requests.

According to an embodiment, header parser 330 may be configured to determine HTTP header information according to compression information received in association with a web page request or HTTP request. This compression information may include information specifying an HTTP header compression format or specifications. This compression information may also include a first compressed HTTP header of an HTTP stream. The determined HTTP header information may include one or more fields of one or more compressed HTTP headers, according to an embodiment.

According to a further embodiment, header parser 330 may determine HTTP header information according to compression dictionary 340. Compression dictionary 340 may be information stored in a structured memory that may be used for parsing compressed HTTP headers. According to an embodiment, compression dictionary 340 may be a local compression dictionary that corresponds to the compression dictionary used to compress the HTTP headers before they were received by HTTP header receiver 320. The compression dictionary may be received or created during setup of an HTTP requester-responder connection. In some cases, a local compression dictionary may be identical or substantially similar to the compression dictionary used for compression. In other cases, a local compression dictionary may be a greater or lesser portion of compression data than the compression dictionary used for compression. A local compression dictionary may correspond to a compression dictionary used to compress the HTTP headers before being received by HTTP header receiver 320. In some cases, compression information may be information necessary to create a local compression dictionary or receive a compression dictionary from an HTTP requester or HTTP responder.

Figure 4:
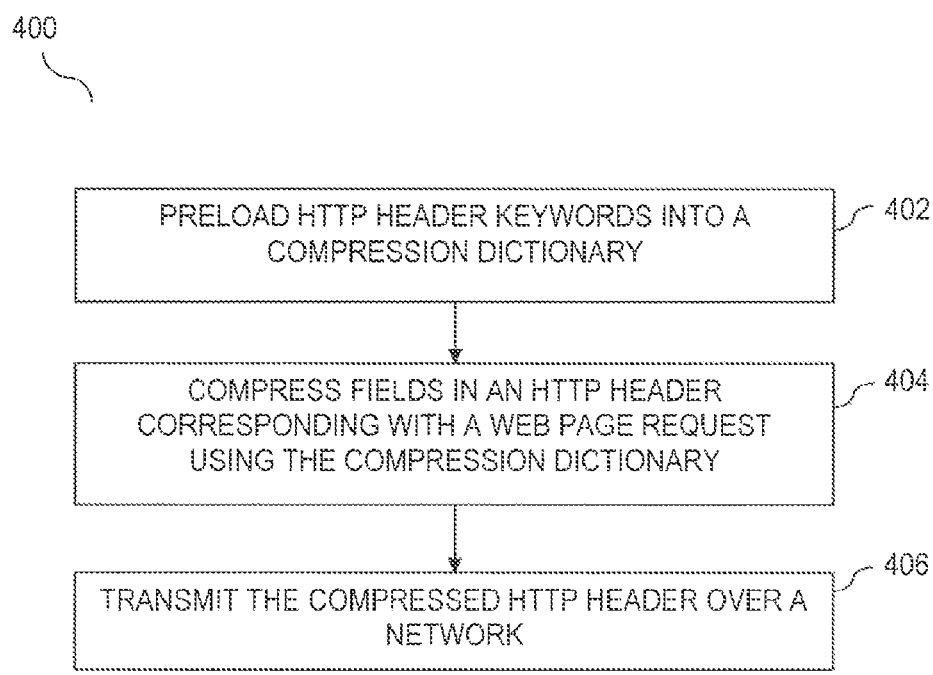
FIG. 4 is a flowchart illustrating a method for reducing web page load time using HTTP header compression according to an embodiment.
Figure 5:
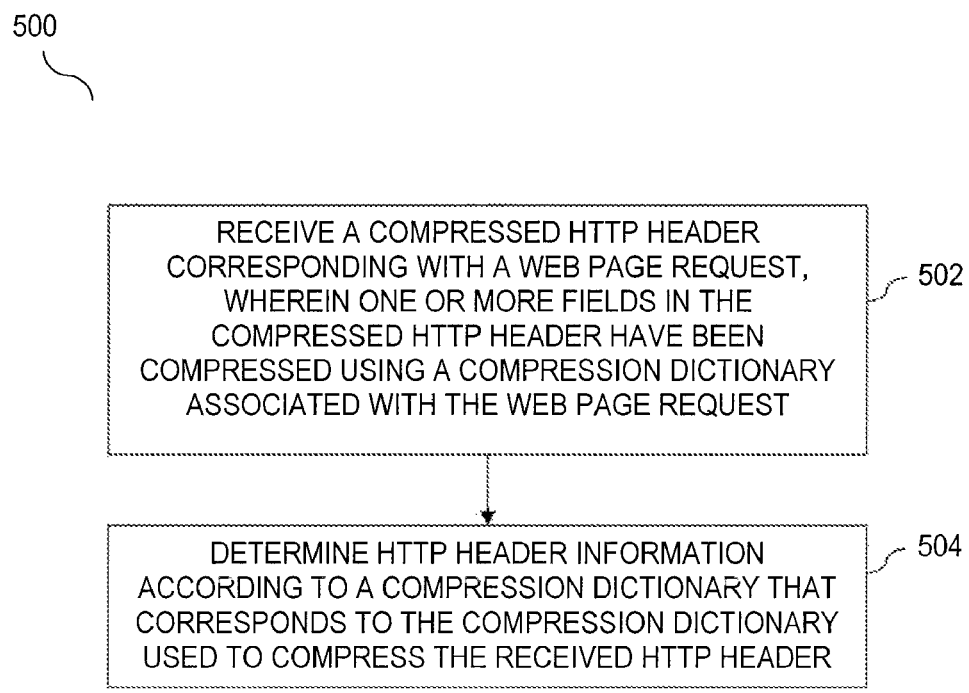
FIG. 5 is a flowchart illustrating a method for reducing web page load time using HTTP header compression according to an embodiment.

FIG. 4 is a flowchart of exemplary method 400 for reducing web page load time using HTTP header compression according to an embodiment. FIG. 5 is a flowchart of exemplary method 500 for reducing web page load time using HTTP header compression according to another embodiment. While methods 400 and 500 are described with respect to an embodiment of the present invention, methods 400 and 500 are not meant to be limiting and may be used in other applications. In an example, methods 400 and 500 may be used to reduce web page or web content load time using HTTP header compression, like systems 200 and 300 of FIG. 2 or 3. However, methods 400 and 500 are not meant to be limited to systems 200 or 300.

As shown in FIG. 4, exemplary method 400 begins at stage 402 where HTTP header keywords are preloaded into a compression dictionary. In some embodiments, header compressor 230 may perform this step. In other cases, a compression dictionary may be received or created using other components. These components may be coupled to header compressor 230 directly or indirectly, such as over a network.

At stage 404, one or more fields of an HTTP header are compressed. The HTTP header may correspond to a web page request. Compression may be performed using a created or received compression dictionary. At stage 406, the compressed HTTP header is transmitted. Stages 402-406 may be implemented as software, hardware, firmware, or any combination thereof.

In FIG. 5, exemplary method 500 begins at stage 502 where a compressed HTTP header is received. The compressed HTTP header may correspond to a web page request. One or more fields of the received HTTP header may be compressed. The HTTP headers may have been compressed using a compression dictionary. Such a compression dictionary may have been preloaded with HTTP header keywords or other information used for compression.

At stage 504, the HTTP header information is determined. The information may be determined according to compression information. This compression information may be received in association with the web page request. The compression information may include a compression dictionary that corresponds to the compression dictionary used to compress the received HTTP header. Stages 502-504 may be implemented as software, hardware, firmware, or any combination thereof.

Example Implementation in a Framing Layer

According to some embodiments, HTTP header compression may be implemented in a framing layer for multiplexing multiple, concurrent streams across a single TCP connection. This framing layer may use the session layer between the HTTP application layer and the TCP transport layer that regulates the flow of data, as shown in Table 1 below.

TABLE 1

| Portion of Protocol Stack | |
|---|---|
| Application | HTTP |
| Session | Framing layer |
| Presentation | SSL |
| Transport | TCP |

This "session" may be comparable to an HTTP request-response pair. For example, to initiate a new request, a web client may first create a new session. Once the session is created, the client can create a new stream to carry the request.

Streams are independent sequences of bi-directional data cut into frames. Streams can be created either by the client or the server, can concurrently send data interleaved with other streams, and can be cancelled. The usage of streams with HTTP is such that a single HTTP request/response occupies a single stream, and the stream is not reused for a second request. This is because streams can be independently created without incurring a round-trip. Upon stream initiation, streams allow for each side to transmit a fixed-length list of name/value pairs to the other endpoint.

According to most embodiments, the usual HTTP GET and POST message formats remain the same; however, the new framing format may be used for encoding and transmitting the data over the wire. The framing layer may be optimized for HTTP-like request-response streams. Stream creation includes sending the HTTP header block. The response is similar to HTTP/1.1 in that it includes a header block followed by a body. However, there are a few notable changes in a compressed HTTP header, according to an embodiment. The response status line may be unfolded into name/value pairs like other HTTP headers. The names of the status line are status and version. These keys may be required to be present. In some cases, the session HTTP reply may include parameters that inform the client regarding the request that would have been made to receive this response, by including url and method keys.

HTTP header compression may be implemented while preserving the existing semantics of HTTP features, according to most embodiments. For example, features such as cookies, etags, vary headers and content-encoding negotiations work as they do with HTTP; the framing layer may replace the way the data is written to the network. Implementations of HTTP header compression may be intended to be as compatible as possible with current web-based applications. That is, from the perspective of the server business logic or application API, nothing may have changed. To achieve this, all or substantially all of the application request and response header semantics are preserved.

As described above, HTTP header compression may be implemented in a session that runs atop TCP, similarly to how HTTP works today. The web client may be expected to be the TCP connection initiator. Because it runs on TCP, transport is reliable. Unlike HTTP, all connections with the session may be persistent connections. The HTTP connection header may not apply.

If a new request header that has not been previously received arrives at a web server, it is used as permission to open multiple, server-initiated streams carrying subresource content. If sent, then the server can freely push all the resources necessary for the page.

According to an embodiment, there may be a single compressed stream (context) for all name value pairs in one direction on a connection. The stream may be initialized with compression dictionary 250. According to an embodiment, the HTTP header block in the session may be created or compressed to remain similar to a regular HTTP header block, but with several differences. For example, the first line of an HTTP request may be unfolded into name/value pairs like other HTTP headers. The names of the first line fields are method, url, and version. These keys are required to be present. The 'url' is the fully-qualified Uniform Resource Locator (URL), containing protocol, host, port, and path.

According to further embodiments, other differences may exist. Duplicate header names may not be allowed. For example, to send two identically named headers, a header may be sent with two values, where the values are separated by a single NULL (0) byte. Also, header names may be all lowercase. The Connection and Keep-Alive headers may no longer be valid and may be ignored if present. Chunked encoding may no longer be valid. The header compressor may be configured to disable chunked encoding. In some cases, clients are assumed to support Accept-Encoding: gzip. Clients that do not specify any body encodings receive gzip-encoded data from the server.

According to some embodiments, for best performance, it is expected that clients will not close open connections until the user navigates away from all web pages referencing a connection, or until the server closes the connection. Servers may be encouraged to leave connections open for as long as possible, but can terminate idle connections after some amount of inactivity if necessary. Once a TCP connection is established, clients and servers may exchange framed messages, including control frames and data frames. In some cases, frames may always have a common header, which is 8 bytes.

CONCLUSION

Embodiments of the invention provide many advantages. HTTP header compression, according to some embodiments, has shown a reduction of over 80% in the size of request and response headers. On a lower-bandwidth DSL link, in which the upload link is only 375 Kbps, request header compression in particular has led to significant page load time improvements for certain sites (e.g., those that issued a large number of resource requests). HTTP header compression, according to some embodiments, has shown a reduction of about 45-1142 ms in web page load time.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method comprising:
    preloading header keywords into a compression dictionary;
    generating a HTTP header block from a header corresponding with a framed message, the HTTP header block having a framing format associated with a session-layer protocol, the session-layer protocol related to a session layer of a protocol stack;
    compressing, with a client computing device, the HTTP header block using one or more of the preloaded header keywords in the compression dictionary, the HTTP header block being compressed based on a compression context different than that for data corresponding with the framed message, wherein the compressing includes disabling chunked encoding of data for transmission over a network; and
    transmitting, using the session layer of the protocol stack, the compressed HTTP header block over the network, wherein the session layer corresponds to a framing layer for multiplexing multiple concurrent streams across a single connection.

2. The method of claim 1, wherein the compressing includes compressing name value pairs in the HTTP header block.

3. The method of claim 1, wherein the compressing includes configuring the HTTP header block to eliminate duplicate fields from the header.

4. The method of claim 1, wherein the compressing includes disabling chunked encoding.

5. The method of claim 1, further comprising:
    identifying fields of the header that are static, wherein one or more of the fields identified as static fields are ignored fields and are not present in a resultant compressed HTTP header block.

6. The method of claim 5, wherein the fields identified as static fields comprise fields of the header with values that have already been transmitted on a communication channel, and wherein the values have not changed since a previous transmission.

7. The method of claim 1, wherein the transmitting comprises:
    transmitting the compressed HTTP header block to a second computing device over a transmission control protocol (TCP) connection initiated by the computing device.

8. The method of claim 1, wherein framed message comprises a request to open a plurality of server-initiated streams initialized with the compression dictionary.

9. The method of claim 8, wherein a particular one of the server-initiated streams remain open until one of: a user navigates away from a web page referencing a particular open stream, or a period of inactivity has elapsed during which no subsequent resource requests or responses are transmit via the particular open stream.

10. The method of claim 1, wherein the compression dictionary is preloaded with a text string containing the header keywords, further comprising:
    extracting one or more header values from the text string in the compression dictionary, wherein one or more packet headers are compressed using the extracted one or more header values.

11. The method of claim 1, wherein each of the header keywords identifies a header name paired with a corresponding header value, wherein the one or more header values are extracted from corresponding pairings.

12. The method of claim 1, wherein the framed message comprises a request for resources on a second computing device communicably coupled to the computing device over the single connection.

13. The method of claim 1, wherein the framed message comprises a response to a prior request for resources on a second computing device communicably coupled to the computing device over the single connection.

14. The method of claim 1, wherein the compression dictionary corresponds to an initial state of compression and a first state of compression corresponds to the compression dictionary and the compressed HTTP header block.

15. The method of claim 14, further comprising:
    generating a second HTTP header block from a second header corresponding with a second framed message;
    compressing, with the client computing device, the second HTTP header block based on the first state of compression, wherein a second state of compression corresponds to the compression dictionary, the compressed HTTP header block, and the compressed second HTTP header block;
    generating a third HTTP header block from a third header corresponding with a third framed message; and
    compressing, with the client computing device, the third HTTP header block based on the second state of compression.

16. The method of claim 1, wherein the framed message includes a common header, the common header having a predetermined size of bytes.

17. The method of claim 1, wherein the session layer is in between an application layer and a transport layer of the protocol stack, and the framing layer utilizes the session layer for sending data over the network.

18. A system comprising:
    a memory comprising a compression dictionary preloaded with header keywords;
    a header compressor, implemented on a client computing device comprising a hardware processor, to:
        generate a HTTP header block from a header corresponding with a framed message, the HTTP header block having a framing format associated with a session-layer protocol, the session-layer protocol related to a session layer of a protocol stack, and
        compress the HTTP header block using one or more of the preloaded header keywords in the compression dictionary, the HTTP header block being compressed based on a compression context different than that for data corresponding with the framed message, wherein to compress the HTTP header block includes disabling chunked encoding of data for transmission over a network; and
    a transmitter, implemented on the client computing device, to transmit, using the session layer of the protocol stack, the compressed HTTP header block over the network, wherein the session layer corresponds to a framing layer for multiplexing multiple concurrent streams across a single connection.

19. The system of claim 18, wherein the c compressor compresses name value pairs in the HTTP header block.

20. The system of claim 18, wherein the header compressor is configured to eliminate duplicate fields from the header.

21. The system of claim 18, wherein the header compressor is configured to use a previous compression state for compression.

22. A computing device-implemented method comprising:
   receiving, using a session layer of a protocol stack, a compressed HTTP header block corresponding with a framed message, the HTTP header block compressed using a compression dictionary associated with the framed message, the HTTP header block compressed based on a compression context different than that for data corresponding with the framed message, the HTTP header block further compressed by disabling chunked encoding of data corresponding with the framed message; and
   determining, with a computing device, header information according to the compression dictionary, the header information identifying data in the compressed HTTP header block arranged in a framing format associated with a session-layer protocol, the session-layer protocol corresponding to the session layer of the protocol stack, wherein the session layer corresponds to a framing layer for multiplexing multiple concurrent streams across a single connection.

23. A system for reducing page load time comprising:
   a receiver, implemented on a computing device comprising a hardware processor, to receive, using a session layer of a protocol stack, a compressed HTTP header block corresponding with a framed message, HTTP header block compressed using a compression dictionary associated with the frame message, the HTTP header block compressed based on a compression context different than that for data corresponding with the framed message, the HTTP header block further compressed by disabling chunked encoding of data corresponding with the framed message;
   a memory comprising a local compression dictionary corresponding to the compression dictionary used to compress the received compressed HTTP header block; and
   a header parser, implemented on a computing device, to determine header information according to the local compression dictionary, the header information identifying data in the compressed HTTP header block arranged in a framing format associated with a session-layer protocol, the session-layer protocol related to the session layer of the protocol stack, wherein the session layer corresponds to a framing layer for multiplexing multiple concurrent streams across a single connection.

24. A non-transitory computer readable storage medium having instructions stored thereon that, when executed by a processor, cause the processor to perform operations including:
   preloading header keywords into a compression dictionary;
   generating a HTTP header block from a header corresponding with a framed message, the HTTP header block having a framing format associated with a session-layer protocol, the session-layer protocol related to a session layer of a protocol stack;
   compressing the HTTP header block using one or more of the preloaded header keywords in the compression dictionary, the HTTP header block being compressed based on a compression context different than that for data corresponding with the framed message, the HTTP header block further compressed by disabling chunked encoding of data corresponding with the framed message; and
   transmitting, using the session layer of the protocol stack, the compressed HTTP header block over a network, wherein the session layer corresponds to a framing layer for multiplexing multiple concurrent streams across a single connection.

* * * * *